United States Patent [19]
Sibbald

[11] 3,802,318
[45] Apr. 9, 1974

[54] APPARATUS FOR CONTROLLING MACHINES

[76] Inventor: Kenneth Robert Sibbald, N. Lodge, Ragdale near Melton Mowbray, Leicestershire, England

[22] Filed: Apr. 27, 1971

[21] Appl. No.: 137,937

[30] Foreign Application Priority Data
May 9, 1970  Great Britain..................... 22536/70

[52] U.S. Cl........................ 91/4 R, 91/32, 91/445, 91/363 R
[51] Int. Cl. .......................... F15b 9/03, F15b 9/09
[58] Field of Search ....... 91/405, 406, 407, 32, 445, 91/363 R, 4 R

[56] References Cited
UNITED STATES PATENTS

| | | | |
|---|---|---|---|
| 2,642,847 | 6/1953 | Roys | 91/407 |
| 3,060,312 | 10/1962 | Jackson | 91/405 |
| 3,272,083 | 9/1966 | Stoll | 91/405 |
| 3,363,514 | 1/1968 | Ramcke | 91/405 |

*Primary Examiner*—Paul E. Maslousky
*Attorney, Agent, or Firm*—Holman & Stern

[57] ABSTRACT

A machine having two relatively movable parts is provided with a control system which has a mechanically movable member mounted on one of the parts and adapted to be displaced from a datum position by movement of the parts into a predetermined position, e.g. a stop position; the displacement of the mechanically movable member is arranged, for practical reasons, to occur at a position which is offset from the predetermined position and the control system provides switches which are actuated by the mechanically movable member at points positioned on either side of the predetermined position of the table by amounts which are determined by the inertial characteristics of the machine, and conditioning means comprising, e.g. relays sensitive to the direction of movement of the parts and are arranged to render an appropriate actuation of one of the switches effective to initiate a change of rate of movement of the parts so that said change becomes effective at the predetermined position.

4 Claims, 2 Drawing Figures

APPARATUS FOR CONTROLLING MACHINES

BACKGROUND OF THE INVENTION

This invention relates to control systems for machines of the kind (hereinafter referred to as "of the kind concerned") in which two parts moving relatively to one another under the influence of drive means in one or the other of two opposite senses are required to undergo a change in the rate of movement thereof when the two parts are at a certain accurately predetermined position relative to each other. The change in rate of movement may be an acceleration, or a retardation, an arrest or a reversal.

The invention is applicable to control systems for machines of the kind concerned wherein one of the two parts is fixed and the other is movable or both of the parts are movable. The or each movable part may be displaceable with a linear or a rotary motion or with any combination of these motions.

Examples of such machines are machine tools, mechanical handling apparatus, textile machinery, printing machinery and packaging machinery. Two specific examples are mechanical handling robot arms and machine tools which have a work carrying table mounted on two or three slides so as to be movable along mutually perpendicular X/Y or X/Y/Z axes and required to be positioned with reference to co-ordinates in order that an operation or operations can be performed at a desired location or locations on work supported on the table. Where a machine has only two relatively movable parts, only one such control system will be provided, but a machine with more than two relatively movable parts, such as a machine tool with a table as described above, will have one such control system for each two parts, i.e., each axis in the example quoted.

PRIOR ART

There are control systems available which can fulfil the requirements of a machine of the kind concerned. However, these systems are expensive, both as to manufacture and operate. For example, one known control system comprises optical gratings which are arranged to extend along side one of the two parts of a machine and an electronic counting system incorporating a photo-sensitive head which is arranged on the other of the two parts to receive information from the markings of the optical gratings. The relative positioning of the parts of the machine is determined at any time by counting the number of optical gratings which have been traversed from a datum position.

In many applications, for reasons of economy and simplicity of operation, it is preferable to use a mechanically actuated system, such as a cam or a trip dog, to initiate a change of rate of motion at a predetermined position in a machine of the kind concerned. However, the use of such a system has previously been limited to simpler machines in which a high degree of accuracy is not required or to situations in which the change of rate of motion required is a reversal, that is to say where the system is merely required to limit the stroke of one machine part relative to another. This is because such mechanically actuated systems comprise a mechanically movable member which is associated with one of the relatively movable parts of the machine and which is adapted to be displaced from a datum position, e.g., as a result of being engaged by a cam or trip dog etc., mounted on the other movable part of the machine as the two parts come towards the predetermined position; the mechanically movable member is arranged to initiate a control sequence, to effect the changed rate of movement, when it has been displaced from the datum position by a predetermined amount which corresponds with the machine parts coming into the predetermined position but which is less than the maximum amount by which the mechanically movable member is displaceable. The mechanically movable member has therefore been arranged to attain its maximum displacement from the datum position a short distance after the arrival of the two parts in the predetermined position. Furthermore, the control sequence must, in practice, be initiated before the two parts come into the predetermined position; this is to compensate for the inertia of the control system and of the machine. Thus a mechanically actuated system of the type set out above has an inherent differential which becomes evident if the relative movement of the two parts towards the predetermined position is reversed, i.e., if the predetermined position is approached from the opposite direction to that for which the system has been set. It has therefore been necessary to provide two separate systems of this type when a predetermined position is to be approached in one or the other of two opposite directions. Such an arrangement is clearly complicated to install and to set and reset.

OBJECTS AND SUMMARY OF THE INVENTION

The object of the present invention is to provide a mechanically actuated system which overcomes these drawbacks, which is inexpensive as compared with known electronic systems and reliable.

According to the present invention a control system for a machine of the kind concerned comprises: a mechanically movable member which is mounted on one of the two relatively movable parts of the machine, and is adapted to be displaced from a datum position in response to movement of said two parts towards the predetermined position in either of two opposite senses of relative movement, and to attain a position between said datum position, and its maximum displacement when the parts are at said predetermined relative position; switch means actuated by the mechanically movable member and adapted to produce in each of said opposite directions of relative movement of the parts, a signal when the displacement of the member corresponds with the arrival of the two parts at a position a predetermined distance (determined by the inertial characteristics of the machine and the control system) in advance of said predetermined position; and conditioning means which is sensitive to the sense of relative movement between the two parts and is adapted to render an appropriate one of said signals effective to initiate a change of rate of motion of said two parts so that said change of rate becomes effective at the predetermined position.

The mechanically movable member may take a number of forms. Preferably, however, it is a plunger having cam faces formed at one end thereof and arranged in a slide way which extends perpendicularly to the line of relative motion of the two parts at the predetermined position. The slide way is provided on one of the two parts and the other of the two parts is provided with a pin at the or each of the predetermined positions which is so arranged as to contact one of the cam faces of the plunger as the parts come into the or each of the predetermined positions in either direction and to press the plunger into the slide way. Alternatively, the mechanically movable member may be pivotable from its datum position when engaged by a pin.

The switch means may be of any suitable form but will be adapted to influence the machine drive. The means may be fluid devices such as piston/cylinder units, optical devices such as photo-sensitive cells, or electrical devices such as potentiometers or capacitors, all of which are responsive to movements of the mechanically movable member. Preferably, however, the switch means are constituted by micro-switches.

Preferably, the control system is arranged to effect the change in the rate of movement in two or more steps which involve a progressive change in the rate of movement. To this end the switch means may be adapted to produce a further signal on each displacement of the mechanically movable member by an amount which corresponds with the arrival of the two parts at a position a further predetermined distance in advance of the predetermined position in one of said opposite directions of relative movement and the conditioning means may be adapted to render an appropriate one of these further signals effective to initiate a preliminary change of rate of motion of said two parts. Such an arrangement is particularly valuable where the motion of two parts moving relatively to one another at high speed is to be arrested at the predetermined position; in such a case the selected further signal will be arranged to decelerate the parts to a reduced "creep" speed.

In implementing this arrangement the control system may have two pairs of micro switches; one micro switch of each pair responds to an initial movement of the mechanically movable member to cause a reduction in the speed of movement of the machine part or parts, and the other micro switch responds to further movement of the mechanically movable member to cause the part(s) to be arrested.

Usually, the mechanically movable member will be mounted on a fixed part of the machine and will be adapted to be engaged by a trip member, e.g., a pin or a cam surface, provided on a relatively movable part. If the rate of movement of the two machine parts is required to be changed in a number of different relative positions, a corresponding number of trip members will be provided, these members coming successively into contact with the mechanically movable member to effect the desired changes at the corresponding positions. In this event, the control system will have associated therewith a programming system for controlling the movement of the movable machine part between two successive positions, i.e., where the part has been arrested, for initiating movement of the part after an appropriate delay, for determining the direction of its movement to the next position, and, if desired, for overriding the control of the system at appropriate times. This programming system may be an electrical or pneumatic system controlled, for example, by pin or plug boards, punched tape, stepping relays, solid state logic circuitry or fluidic logic.

The trip member/s may be mounted in an adjustable fashion so as to permit adjustment of the position/s at which the rate of movement of the machine parts takes place.

A preferred embodiment of the invention will now be described with reference to the accompanying drawings, in which,

DETAILED DESCRIPTION OF THE INVENTION

Figure 1:
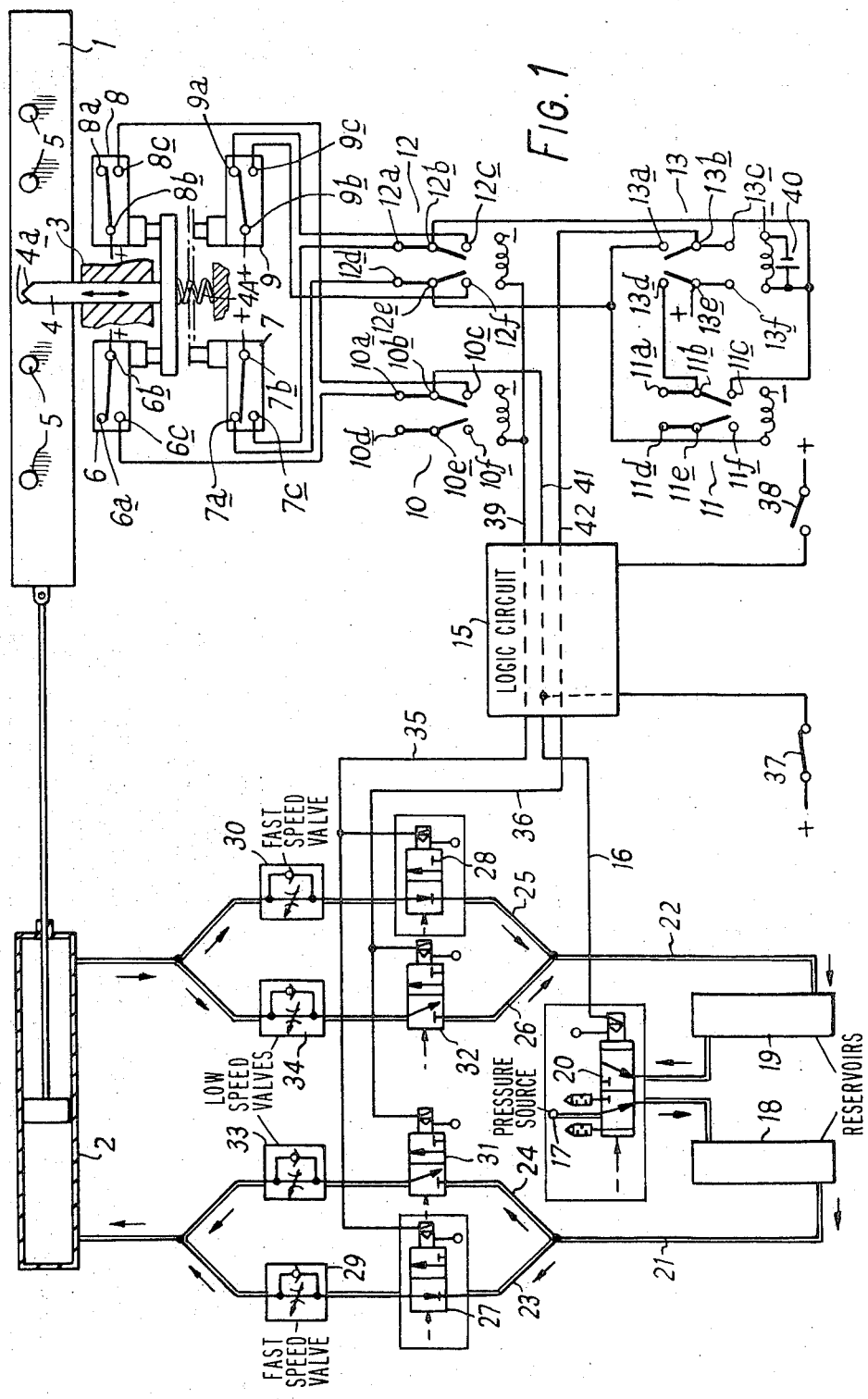
FIG. 1 is a diagrammatic representation of a typical machine of the kind concerned which is controlled by a control system in accordance with the invention, and, FIG. 2 is a graph which depicts significant features of the operation of the control system of FIG. 1.

FIG. 1 shows a machine work support table 1 which is movable on slide ways (not shown) by means of a hydraulic piston cylinder drive means 2. The work support table 1 is movable in a linear fashion to the right or left as shown in FIG. 1 and constitutes one of the two parts of the invention.

The other of the two parts of the invention is constituted by a frame of the machine, shown in part at 3, in which is formed a slide way for a plunger 4. The plunger 4 (which constitutes the mechanically movable member of the invention) is biased by means of spring 4a upwardly as shown in FIG. 1 so that it is urged towards the work support table 1. The plunger 4 is, moreover, formed with a pair of 45° cam faces 4a at its tip and this tip is so positioned that it is engageable by a number of trip pins, four of which are indicated at 5, which are spaced along one edge of the work support table 1. Thus as the table 1 moves either from right to left or from left to right in the drawing the trip pins 5 will successively engage the plunger 4, will displace it downwardly from its datum position as shown in the drawing; they will then pass clear of the plunger 4 and release it so that it returns to its datum position. The path of the motion of the plunger 4 when engaged by a pin 5 is shown in the form of a graph in FIG. 2. In the graph, the horizontal axis represents the datum position of the plunger 4 and the vertical axis represents the predetermined position at which the rate of motion of the work support table 1 is to be changed.

The plunger 4 has associated therewith two pairs of micro switches 6,7 and 8,9 for controlling the change of rate of motion of the work support table 1 at the predetermined positions determined by the location of each of the trip pins 5. These micro switches control the machine drive means, i.e., the piston cylinder unit 2, by way of four relays 10, 11, 12, and 13, with these parts constituting the conditioning means of the invention, a logic circuit 15 and a drive system of hydraulic and electromagnetic valves.

The system of valves provides for two speeds of movement of the table 1 in each direction and for locking the table in any desired position. The power for moving the table is derived from a pneumatic pressure source 17. The pressure is applied either to an oil reservoir 18 or to a similar reservoir 19 under the control of a five-way electromagnetically actuated valve 20 which is energized, when required, from the logic circuit 15 through a line 16.

The application of pressure to either of the reservoirs 18 or 19 generates a pressure in oil contained therein and this oil transmits power to the piston cylinder unit 2 by way of pipe-line 21 or 22 respectively.

Each of these pipe-lines 21 and 22 has two branches numbered 23, 24 and 25 and 26 respectively. The branches 23 and 25 each incorporate an electromagnetic valve (27 and 28 respectively) and a fast speed setting valve (29 and 30). The remaining branches each incorporate an electromagnetic valve (31 and 32) and a low speed setting valve (33 and 34). Each of the setting valves (29, 30, 33 and 34) incorporates an appropriately apertured restrictor jet and a one way bypass valve which is arranged to open to permit oil to pass into the cylinder 2 at full flow but to close when oil attempts to flow therethrough out of the cylinder thereby directing it through the relevant restrictor jet. As shown in the drawing the electromagnetic valves 27 and 28 are controlled in parallel from the logic circuit 15 via a line 35 and the valves 31 and 32 are similarly controlled via a line 36.

The valve 20 is so constructed that, when it is energised, pneumatic pressure is applied to the reservoir 18 with the reservoir 19 being vented to atmosphere; when it is deenergised, on the other hand, the reservoir 19 is pressurised and the reservoir 18 is vented. Thus if the work support table 1 is to be moved to the left at high speed the valves 27 and 28 are energised, the valves 20, 31 and 32 remaining de-energised. The pressure thus developed in the reservoir 19 thus forces oil along the pipe-line 22 through the open valve 28 and into the right hand end of the cylinder 2. This propels the piston of the latter towards the left and thus moves the table 1 in the same direction. Oil displaced from the left hand end of the cylinder 2 passes through the restrictor jet of the valve 29, the one way by pass valve therein being closed at this time, so that the rate of movement of the table 1 is governed by the rate at which oil can pass through this jet. The oil is then returned to the reservoir 18 by way of the open valve 27 and the pipe line 21. Movement of the table to the left at low speed is achieved in a similar manner, except that the valves 31 and 32 are energised and the valves 27 and 28 are de-energised so that the rate of movement of the table 1 is governed by the rate at which oil can pass through the restrictor jet in the valve 33.

Movement at high and low speeds to the right is similarly achieved except that the valve 20 is energised with the result that it is the reservoir 18 which is pressurised.

Thus the logic circuit 15 is arranged to energise the lines 16, 35 and 36 in the following manners;
a. for fast movement to left - line 35 energised,
b. for slow movement to left - line 36 energised,
c. for fast movement to right - lines 35 and 16 energised,
d. for slow movement to right - lines 36 and 16 energised.

To arrest the table 1, the lines 35 and 36 are de-energised; this closes the valves 27, 28, 31 and 32 thereby trapping oil in the piston/cylinder 2 and positively locking the table 1 against movement.

The logic circuit 15 is controlled by directional switches 37 and 38 and by the micro switches 6 to 9 and relays 10 to 13 so as to energise the appropriate one or combination of the lines 16, 35 and 36 at the correct times. The directional switches 37 and 38 are shown diagrammatically in FIG. 1 and it will be appreciated that they can be constituted by pin or plug boards, by punched tape, by stopping relays or by solid state logic or fluidic circuitry all as is well known. All that is required is that the switch 37 be closed when the table 1 is to be moved towards the left and that the switch 38 be closed when the table is to be moved towards the right; each of these switches is in a power supply to the logic curcuit 15.

The switches 37 and 38 are further arranged to supply power to the relays 10 and 13 so as to set them in a condition which is appropriate to the selected direction of motion of the table 1.

For convenience each of the relays 10 and 13 is shown as a two-pole changeover relay having two pair of normally closed contacts which are designated $e$ and $f$ and $b$ and $c$ and two pair of normally open contacts, designated $e$ and $d$ and $a$ and $b$ respectively. It will be noted that a capacitor 40 is connected in parallel with the coil of relay 13.

The micro-switches 6 to 9 are of similar construction and each has a single pair of normally closed contacts designated $a$ and $b$ and a pair of normally open contacts, designated $b$ and $c$. The common contacts of the micro-switches are all connected to the positive lead of a power supply, while the negative lead of this supply is connected to one side of each of the energising coils of the relays 10 to 13.

FIG. 1 shows the various components in the configurations taken up while the table 1 is being moved at a high speed to the right, i.e., with the lines 35 and 16 energised, i.e., the valves 27 and 28 are open and the valve 29 is set so that the reservoir 18 is pressurised and the reservoir 19 is vented. At this time, the relays 10 and 12 are energised, by virtue of a connection to the power supply established from the switch 37 via the logic circuit 15 and a lead 39; this renders the micro switches 6 and 7 effective to control the movement of the table. The relay 11 is also energised by virtue of a connection to the power supply which is established by way of the contacts 7a and 7b of the micro switch 7 and the contacts 12d and 12e of the relay 12 which are closed.

Figure 2:
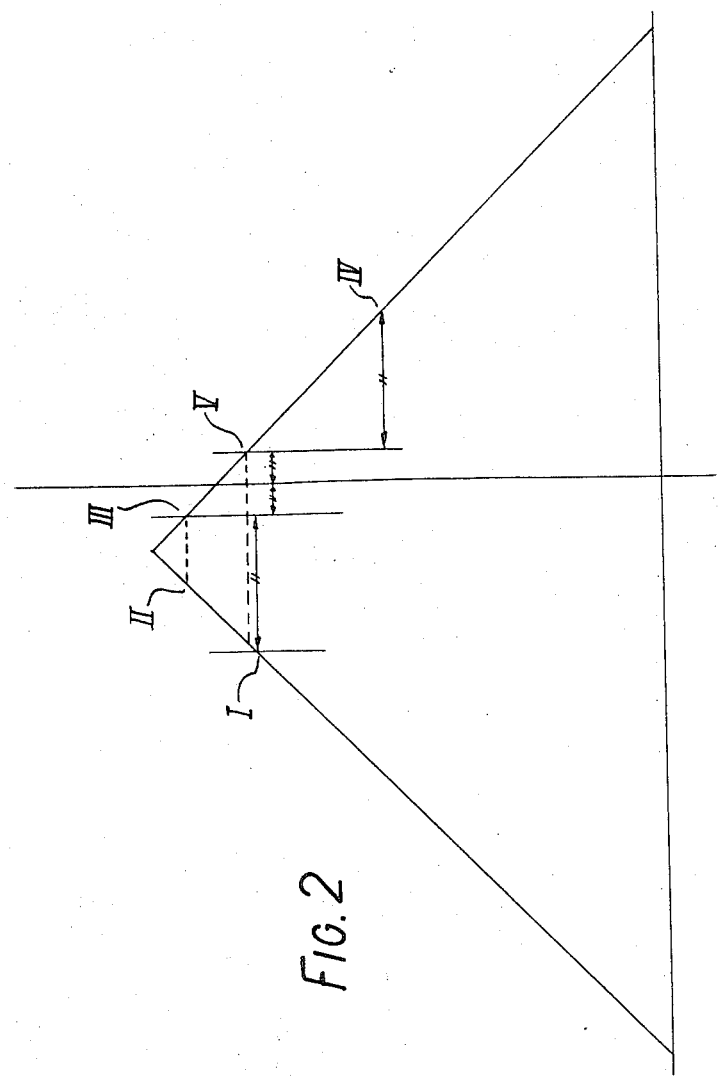

Now the table 1 is to be arrested, after an initial deceleration to a slow or "creep" speed, at a position which is determined by the frist displacement of the plunger 4 by a pin 5 (such a position is indicated by the vertical axis of the graph in FIG. 2).

As the relevant pin 5 engages the plunger 4 the latter is pressed downwardly. After a predetermined displacement of the plunger 4, which is determined by the positioning of the effective micro switch 6 and which corresponds with the position I in FIG. 2, the micro switch 6 is released. This closes the contacts 6b and 6c and supplies electrical power to the logic circuit 15 by way of a line 41 and contacts 10a and 10b of the relay 10. The logic circuit 15 thereupon de-energises the line 35 and energises the line 36 so that valves 27 and 28 close, the valves 31 and 32 open and the table 1 is decelerated to the "creep" speed. As the table continues to move to the right, the displacement of the plunger 4 depresses the micro switch 7; this occurs at position II in FIG. 2. Depression of the micro switch 7 opens contacts 7a and 7b of this switch, thereby de-energising the relay 11, and closes contacts 7b and 7c so that a connection is effected between the positive supply and contact 13d of the relay 13 by way of contacts 11b and 11c of relay 11 and contacts 12a and 12b of relay 12 and the relay 13 is energised.

Movement of the table 1 to the right continues while the pin 5 moves over the tip of the plunger 4 (the point of maximum displacement in the graph of FIG. 2) and until the plunger 4 releases the micro switch 7 at the position III in FIG. 2. This latter position corresponds with the arrival of the table 1 at a position a predetermined distance, which depends on the inertia of the table and the drive therefore, before the position at which the table is to be arrested. The release of the micro switch 7 opens the contacts 7c and 7b and closes the contacts 7b and 7d so as to interrupt the electrical supply to the coil of the relay 13 and supply power to the contact 13a of this latter relay. Notwithstanding the interruption of power to the coil of relay 13 this relay remains energised for a predetermined short time while the capacitor 40 discharges. This causes a pulse of electrical power to be supplied to the logic circuit 15 by way of line 42 via the contacts 7b and 7a of the micro switch 7 and the contacts 13a and 13b of the relay 13.

The pulse of electrical power causes the logic circuit 15 to de-energise the line 36 so arresting the table 1 in the predetermined position. Movement of the table in either direction may be restarted by closing the appropriate one of the directional switches 37 and 38.

When the table is moving to the left it is the micro switches 8 and 9 which are rendered effective to control the positions at which the table is decelerated and arrested. The logic circuit, which energises the line 35 to cause high speed movement to the left, does not energise the line 39 so that the relays 10 and 12 remain de-energised. Accordingly the relay 13 is energised by way of the micro switch 9 and contacts 12b and 12c of relay 12.

Thus as the table 1 moves to the left and one of the pins 5 contacts the plunger 4 to displace the latter downwardly shown at IV in FIG. 2) the micro switch 8 is released at position IV in FIG. 2. This closes contacts 8b and 8c and energises the line 41, via contacts 10b and 10c of the relay 10, to cause the logic circuit 15 to de-energise the line 35 and energise the line 36.

Further movement of the table 1 towards the left brings the latter into a position, corresponding with the position V in FIG. 2, in which the plunger 4 depresses the micro switch 9. This takes place a predetermined distance, determined by the inertia of the table and its drive, before the arrest position and has the effect of opening contacts 9a and 9b and closing contacts 9b and 9c of the micro switch 9. As a result the power supply to the relay 13 is interrupted and power is supplied to contact 13a of this relay via contacts 12e and 12f of relay 12. However the capacitor 40 holds the relay 13 energised for a short time so that a pulse of power is fed to the logic circuit via line 42, contacts 13a and 13b and 12e and 12f of the relays 13 and 12 respectively. This pulse of power causes the arrest of the table 1.

Although the system described has utilized micro switches and relays it will be appreciated that the invention as claimed can be performed in other ways. For example, the plunger 4 could be connected to a linear resistance and this latter component could be utilized to actuate solid state switches at the appropriate times. Alternatively a linear resistance could be utilized to control a proportioning device to give a continuously variable deceleration which varied directly with the distance of the table 1 from the predetermined position.

I claim:

1. A control system for a machine of the kind in which two parts moving relatively to each other under the influence of drive means in one or the other of two opposite senses are required to undergo a change in the rate of movement thereof when the two parts are at a certain accurately predetermined position relative to each other, the control system comprising a mechanically movable member mounted on one of the two relatively movable parts of the machine for linear movement perpendicular to the direction of movement of the other relatively movable part, and said movable member being displaceable from a datum position in response to movement of at least one of said two parts towards the predetermined position in either of two opposite senses of relative movement and to attain a position between said datum position and its maximum displacement when the parts are at said predetermined relative position; the improvement including switch means operably associated with and actuated by the mechanically movable member and producing, in each of said opposite senses of relative movement of the parts, a signal when the displacement of the member corresponds with the arrival of said one of the two parts at a position a predetermined distance determined by the inertial characteristics of the machine and the control system in advance of said predetermined position; and conditioning means operably related to said switch means, said conditioning means being sensitive to the sense of relative movement between the two parts and rendering an appropriate one of said signals effective to initiate a change of rate of motion of said two parts so that said change of rate becomes effective at the predetermined position.

2. A control system for a machine of the kind in which two parts moving relatively to each other under the influence of drive means in one or the other of two opposite senses are required to undergo a change in the rate of movement when the two parts are at a certain accurately predetermined position relative to each other, the control system comprising a mechanically movable memeber mounted on one of the two relatively movable parts of the machine, and said movable member being displaceable from a datum position in response to movement of at least one of said two parts towards the predetermined position in either of two opposite senses of relative movement, and to attain a position between said datum position and its maximum displacement when the parts are at said predetermined relative position; the improvement including switch means operably associated with and actuated by the mechanically movable member and producing in each of said opposite senses of relative movement of the parts, a signal when the displacement of the member corresponds with the arrival of said one of the two parts at a position a predetermined distance in advance of said predetermined position; and conditioning means operably related to said switch means, said conditioning means being sensitive to the sense of relative movement between the two parts and rendering an appropriate one of said signals effective to initiate a change of relative rate of motion of said two parts so that said change of rate becomes effective at the predetermined position, the movable member comprising a plunger having cam faces at one end thereof, said plunger being mounted on one of the two parts in a slideway which extends perpendicular to the line of relative motion between said two parts at the predetermined position, and the other of said two parts being provided with a member causing movement of the plunger in the slideway as the parts come into the predetermined position.

3. The control system in accordance with claim 2, wherein the switch means comprises two micro-switches mounted on the aforesaid one of said two parts in the path of the movable member.

4. The control system in accordance with claim 1, including further switch means actuable by the mechanically movable member to produce a signal on each displacement of the movable member by an amount which corresponds with the arrival of said one the two parts at a position a further predetermined distance in advance of the predetermined position, and the conditioning means rendering an appropriate one of the signals produced by said further switch means effective to initiate a change of rate of motion to a rate which is intermediate the original rate of motion and the rate of motion which is to become effective at the predetermined position.

* * * * *